United States Patent [19]
Chang et al.

[11] Patent Number: 5,808,793
[45] Date of Patent: Sep. 15, 1998

[54] LOW-COST COMPACT OPTICAL ISOLATORS

[75] Inventors: Kok Wai Chang, Sunnyvale; Long Yang, Union City, both of Calif.

[73] Assignee: Hewlett-Packard Company, Palo Alto, Calif.

[21] Appl. No.: 588,042

[22] Filed: Jan. 17, 1996

[51] Int. Cl.$^6$ .................................................. G02B 1/10
[52] U.S. Cl. .................... 359/484; 359/900; 372/703; 385/27; 385/35
[58] Field of Search ........................... 372/703; 359/484, 359/500, 900; 385/27, 35, 42

[56] References Cited

U.S. PATENT DOCUMENTS

| | | | |
|---|---|---|---|
| 4,974,944 | 12/1990 | Chang | 359/497 |
| 5,040,863 | 8/1991 | Kawakami et al. | 359/484 |
| 5,267,077 | 11/1993 | Blonder | 372/703 |
| 5,305,137 | 4/1994 | Ohkawara | 372/703 |
| 5,315,431 | 5/1994 | Masuda et al. | 359/484 |
| 5,325,456 | 6/1994 | Cullen et al. | 359/494 |
| 5,402,260 | 3/1995 | Tsuneda et al. | 372/703 |
| 5,446,578 | 8/1995 | Chang et al. | 359/282 |
| 5,452,122 | 9/1995 | Tsuneda et al. | 372/703 |
| 5,566,264 | 10/1996 | Kuke et al. | 385/49 |
| 5,611,006 | 3/1997 | Tabuchi | 385/14 |

FOREIGN PATENT DOCUMENTS

| | | | |
|---|---|---|---|
| 0 408 251 A1 | 1/1991 | European Pat. Off. | G02F 1/09 |
| 0 512 572 A2 | 11/1992 | European Pat. Off. | G02F 1/09 |
| 0 640 853 A1 | 3/1995 | European Pat. Off. | G02B 6/12 |
| 0 742 467 A1 | 11/1996 | European Pat. Off. | G02F 1/09 |
| 0 747 747 A1 | 12/1996 | European Pat. Off. | G02B 27/28 |
| A 3-243911 | 10/1991 | Japan | 372/703 |
| A 3-284713 | 12/1991 | Japan | 372/703 |
| 2 245 378 | 1/1992 | United Kingdom | G02B 6/42 |

OTHER PUBLICATIONS

Chang et al., "Polarization Independent Isolator Using Spatial Walkoff Polarizers," IEEE Photonics Technology Letters, vol. 1, No. 3, Mar. 1989.

Chang et al., "High–performance single–mode fiber polarization–independent isolators," Optics Letters, vol. 15, No. 8, Apr. 15, 1990.

*Primary Examiner*—Paul M. Dzierzynski
*Assistant Examiner*—John Juba, Jr.

[57] ABSTRACT

An optical isolator unit is aligned, assembled, and subsequently diced into smaller isolator chips for placement in a micro-optical bench, along with input and an output fiber coupling ball lenses. Polarizers (for polarization-dependent isolators) or birefringence walkoff crystals (for polarization-independent isolators) are aligned and then glued together with 45° Faraday rotators using an optical-grade adhesive. The surfaces of the components are AR-coated to match the index of the optical-grade adhesive. An optical isolator unit formed in this manner is then diced into a plurality of optical isolator chips with a high-speed wafer saw. The optical isolator unit is preferably mounted on any one of its sides in such a way that only a smallest possible cutting depth is required for dicing, i.e., it is mounted such that a thinnest dimension of the isolator is presented for cutting, such that material loss due to cutting is reduced and delamination of the optical isolator chips is prevented.

9 Claims, 6 Drawing Sheets

LOW-COST COMPACT OPTICAL ISOLATORS

BACKGROUND OF THE INVENTION

1. Technical Field

The invention relates to light transmission systems. More particularly, the invention relates to low cost, compact optical isolators for a light transmission system.

2. Description of the Prior Art

The use of fiber optics in communications has developed rapidly in recent years and, with such progress, new problems have arisen. For example, when a light source transmits light through an optical fiber to another optical device, the light transmitted through the optical fiber is reflected by an end face of a fiber, or by other part of the optical device at the other end, such that reflected light returns to the light source. Multiple reflections at the end faces of optical fibers or other optical devices can cause echoes. These effects adversely affect the performance of the source and compromise the information communicated in the fiber.

Various optical isolators and non-reciprocal devices have been developed to overcome the problem of light reflections and echoes described above. One such device is disclosed by K. W. Chang, Optical Nonreciprocal Device, U.S. Pat. No. 4,974,944 (4 Dec. 1990), in which walkoff crystals are used for optical isolation. In other optical isolator designs, birefringent wedges are used, such as in U.S. Pat. No. 4,548,478, issued to Shirasaki.

See also K. W. Chang, Polarization Preserving Optical Isolator, U.S. Pat. No. 5,446,578 (29 Aug. 1995), which discloses an optical non-reciprocal device for passing light of any polarization in a forward direction from a first point to a second point, and for reducing light passing in a reverse direction from the second point to the first point, where the device comprises at least two walkoff crystal members arranged in a linear array for separating light into two rays and at least one non-reciprocal rotation element interposed between two adjacent crystal members.

Polarization-dependent isolators using linear polarizers together with Faraday rotators are well known. The state of the art for polarization-independent isolators using spatial walkoff polarizers is discussed in K. W. Chang, W. V. Sorin, *Polarization Independent Isolator Using Spatial Walkoff Polarizers,* IEEE Photonics Technology Letters, Vol. 1, No. 3 (March 1989); and in K. W. Chang, W. V. Sorin, *High-Performance Single-Mode Fiber Polarization-Independent Isolators,* Optics Letters, Vol. 15, No. 8 (April 1990). FIG. 1 shows a state of the art isolator 10, in which light from an input single-mode fiber 12 is focused by a first SELFOC™ lens 14 to an isolator 11, and thence through a second lens 15 to an output single-mode fiber 13. A magnetic field 18 is associated with the isolator.

Non-reciprocal Faraday rotation in the isolator 11 is provided by bismuth substituted YIG films (Bi-YIG) which typically operate in the 1.3 and 1.55 $\mu$m wavelength range and typically provide 45° of Faraday rotation in thicknesses of less than 500 $\mu$m. Birefringent $TiO_2$, i.e., rutile, crystals are used to provide a spatial walkoff for extraordinary polarization travelling through the isolator. The polarizers in the isolator are typically realized by using the spatial walkoff from the birefringent crystals combined with the spatial filtering provided by the single-mode fiber. The crystals may be slightly angled and the fiber end faces may be polished, for example at an angle of 6°, to reduce back reflections from the internal surface of the isolator.

Such isolators are quite large because the isolator is actually composed of individual pieces. Such structure is sometimes referred to as a "freespace" structure. The various pieces of the isolator are each placed in a separate holder and are then AR-coated to air. Thus, for each isolator it is necessary to assemble each crystal, where each crystal has a different orientation. Examples of such isolators include the Freespace Interfaced Fiber Isolator (package size 3.8 mm×13 mm), Laser Interfaced Fiber Isolator (package size 3.5×23.5 mm), Miniature Optic Freespace Isolator (package size 3.0 mm×1.5 mm—one stage; 3.0 mm×3.0 mm—two stage), and Polarization Insensitive Miniature Optic Freespace Isolator (package size 4.0 mm×5.0 mm), each of which is manufactured by E-Tek Dynamics, Inc.

Accordingly, assembly of the isolator requires the steps of arranging the individual crystals in the holder in a specific orientation. It is therefore necessary to have an alignment mark for each crystal. If the isolator is made small in size, then it is very difficult to arrange the individual elements into a complete, properly aligned isolator. Additionally, it is difficult to handle the assembled isolator.

Thus, while such isolators are promising, the cost of manufacture and critical need for precision alignment provide significant barriers to the widespread acceptance of such isolation technology. Further, the ability to miniaturize such isolators is approaching the physical limits imposed by the need to assemble each individual isolator component mechanically. Thus, such isolators severely limit the development of emerging technologies where such miniaturization is a critical factor. This is especially true where miniature optical isolators may be desirable, e.g., in a micro-optical bench. It would therefore be advantageous to provide small, low-cost optical isolators for both polarization-independent and polarization-dependent applications.

SUMMARY OF THE INVENTION

The invention provides a preassembled, low-cost optical isolator having the capability of large optical isolators. An optical isolator unit is assembled and subsequently diced into smaller isolator chips for placement in a micro-optical bench, such as a silicon or ceramic bench, along with input and an output fiber coupling AR-coated ball lenses. In polarization-independent applications, larger birefringence walkoff crystals and a 45° Faraday rotator are first aligned and then glued together with an optical-grade epoxy. In polarization-dependent applications, polarizers and a 45° Faraday rotator are first aligned and then glued together with an optical-grade epoxy. Prior to gluing, the surfaces of the components are AR-coated to match the index of the optical epoxy. An optical isolator unit formed in this manner is then diced into smaller isolator chips with a high-speed wafer saw. The optical isolator unit is preferably mounted on any one of its sides in such a way that only a smallest possible cutting depth is required for dicing, i.e., it is mounted such that a thinnest dimension of the isolator is presented for cutting.

This procedure reduces material loss due to cutting and prevents delamination of the smaller isolator chips. Thus, the invention provides an optical isolator in which the material cost is reduced. Because the isolator chips are very small, it is possible to place such isolators on a micro-optical bench between a pair of coupling AR-coated ball lenses, which further reduces the size requirement of each isolator chip. The use of a micro-optical bench is significant because it allows precise, passive positioning of the optical components.

The technique for fabricating the herein described isolator chips also reduces the handling cost associated with the assembly of several small isolator components into a completed assembly by aligning and preassembling the isolator components in a large isolator assembly, and by subsequently dicing the large assembly into several small isolator chips. In this way, only a single alignment step and assembly step is required to produce several optical isolators. Thus, the invention allows for a reduction of cost for fiber collimators, as well as providing improved, cost reduced, polarization-dependent/independent isolators for laser diodes and fiber transmission systems.

DETAILED DESCRIPTION OF THE INVENTION

Figure 1:
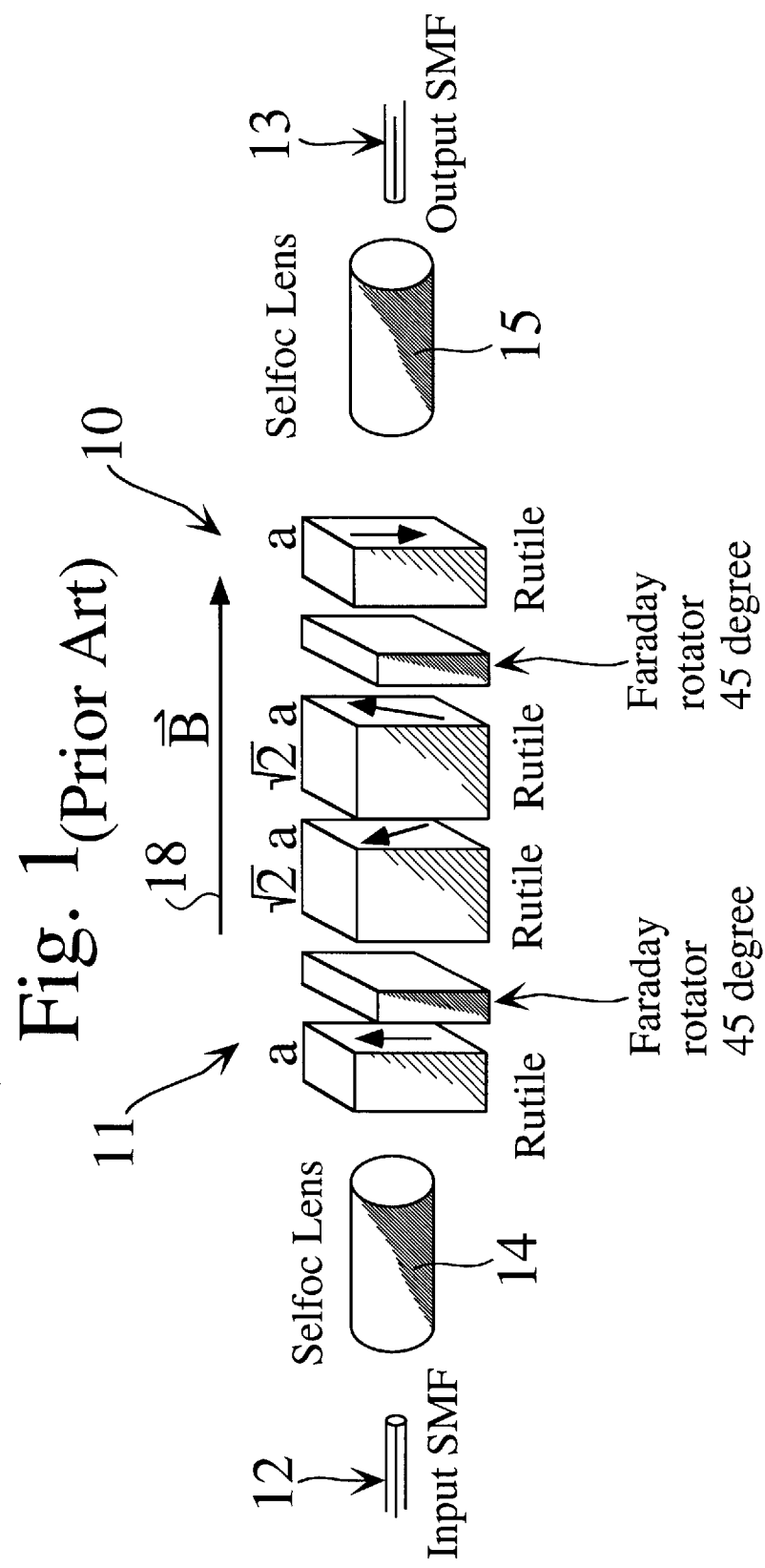
FIG. 1 is a block schematic diagram of a prior art optical isolator.

The invention provides a low cost optical isolator that exploits to advantage the capability of large, preassembled optical isolators. In accordance with the invention, an optical isolator unit is aligned, assembled, and subsequently diced into smaller isolator chips for placement in a micro-optical bench, such as a silicon or ceramic bench, along with input and output fiber coupling AR-coated ball lenses. In polarization-independent applications, the optical isolator unit is preferably comprised of one or more larger birefringence walkoff crystals that are first aligned and then glued with an optical-grade adhesive, such as an optical-grade epoxy, to one or more 45° Faraday rotators. In polarization-dependent applications, polarizers and a 45° Faraday rotator are first aligned and then glued together with an optical-grade adhesive.

For polarization-independent applications, the preferred embodiment of the invention may comprise an optical isolator unit, such as that disclosed by K. W. Chang, Optical Nonreciprocal Device, U.S. Pat. No. 4,974,944 (4 Dec. 1990), although the principles of the invention taught herein are readily applied to other types of optical isolators. See, also K. W. Chang, Polarization Preserving Optical Isolator, U.S. Pat. No. 5,446,578 (29 Aug. 1995). An optical isolator unit formed in this manner typically exhibits a rectangular cross section when such section is taken along a longitudinal axis of the optical isolator unit.

The surfaces of the components are antireflection (AR) coated to match the index of the optical-grade adhesive. Such AR coating provides an index-matching coating that corrects for a refractive index difference between two adjoining mediums. The actual AR coating used depends on the system in which the coating is required. For example, a thin layer of a material such as magnesium oxide, titanium dioxide, and silicon dioxide is deposited on the surface of a high refractive index material to allow a particular wavelength or band of wavelengths to pass without significant reflection. Multiple coatings may be placed onto the surface to match the material to other wavelengths. AR coatings are well known in the art, see for example *The Handbook of Optical Coatings for Fiber Optic Devices*, Evaporated Coatings, Inc.

In the invention, the AR coating is provided to match the refractive index of each component of the optical isolator unit to that of the optical-grade adhesive that holds the optical isolator unit components together. Therefore, instead of matching the index of air, which is 1, the AR coating matches the optical-grade adhesive index, which closer to that of glass, i.e., about 1.52. In other embodiments of the invention, the optical-grade adhesive may be replaced by any known optical-grade adhesive material, such as an optical-grade epoxy.

The optical isolator unit is diced into smaller isolator chips using a high-speed wafer saw or other such dicing devices as may be known in the art. During such dicing operation, the optical isolator unit is preferably mounted on any one of its sides in such a way that only a smallest possible cutting depth is required for dicing, i.e., it is mounted such that a thinnest possible dimension of the isolator is presented for cutting. This procedure reduces material loss due to cutting and prevents delamination of the small isolator chips that are produced by such cutting.

Figure 2:
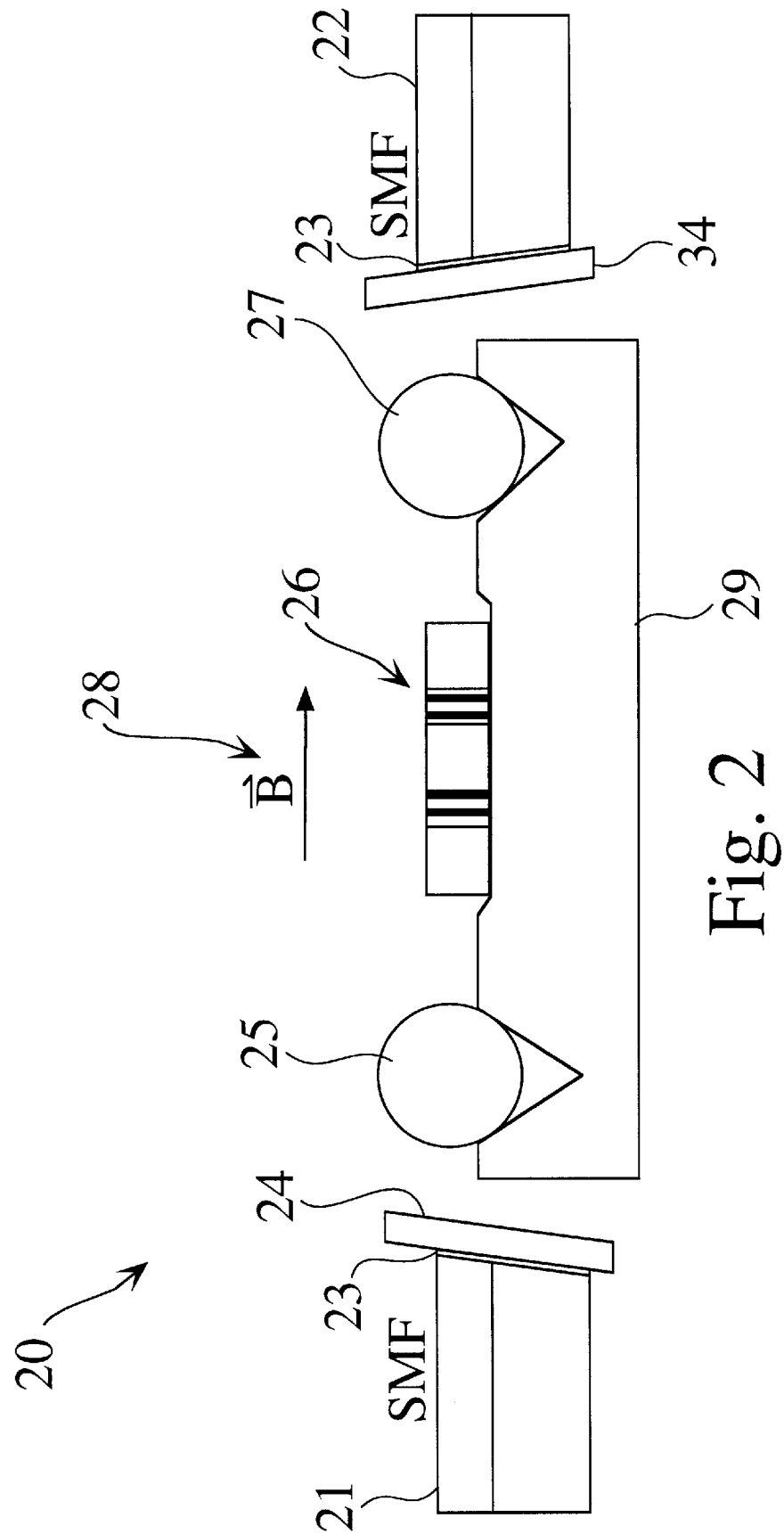
FIG. 2 is a block schematic diagram of an optical isolator according to a first preferred embodiment of the invention.

FIG. 2 is a block schematic diagram of an optical isolator 20 according to a first preferred embodiment of the invention. An input single-mode optical fiber 21 provides a light source that is coupled via the optical isolator to an output single-mode optical fiber 22. Thus, this embodiment of the invention is useful for a fiber-to-fiber application.

Because this type of isolator is used in optical systems that only allow light to travel in one direction, light enters the isolator through an AR-coated glass 24 that is secured to the input single-mode fiber 21 by an index-matching adhesive 23, such as an optical grade epoxy. Light enters a first AR-coated ball lens 25 and is focused thereby to an optical isolator chip 26. The AR-coated ball lenses 25, 27 and optical isolator chip 26 are all preferably mounted on a micro-optical bench 29 that is fashioned in such way that the various optical isolator components are securely held in an aligned configuration.

Once light has passed across the optical isolator chip 26, it is focused through a second AR-coated ball lens 27, and thence through an AR-coated glass 34, to an output single-mode fiber 22. Thus, the optical isolator chip 26 is a one-way light transmitting device, in which any light that is reflected back along the optical path misses the input single-mode fiber. Accordingly, no light is reflected back to the input single-mode fiber.

The optical isolator chip 26 operates in conjunction with a magnet (not shown) that produces a magnetic field B 28 to provide a non-reciprocal characteristic to the isolator. The preferred embodiment of the invention uses either a very small external magnet or the optical isolator may be positioned inside, and surrounded by, a larger magnet, depending on the preferred package design.

The active area of the optical isolator chip is very small, i.e., 200 $\mu$m×200 $\mu$m. Thus, the invention provides a significant size reduction when compared to conventional optical isolators, which are typically on the order of 2 mm×2 mm.

As discussed above, an optical isolator unit is preferably formed by carefully aligning the isolator components, and then joining the isolator components with an index-matching adhesive, where each element so joined is AR-coated to match the index of the element to the index of the adhesive.

Figure 3A:
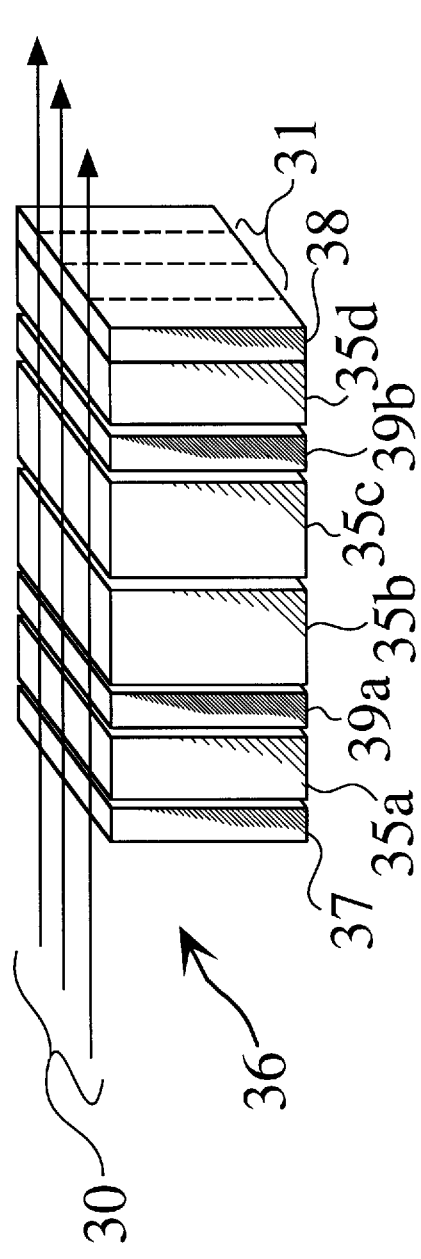
FIGS. 3a–3c show the dicing steps that are used to produce a polarization-independent optical isolator according to the invention.
Figure 3B:
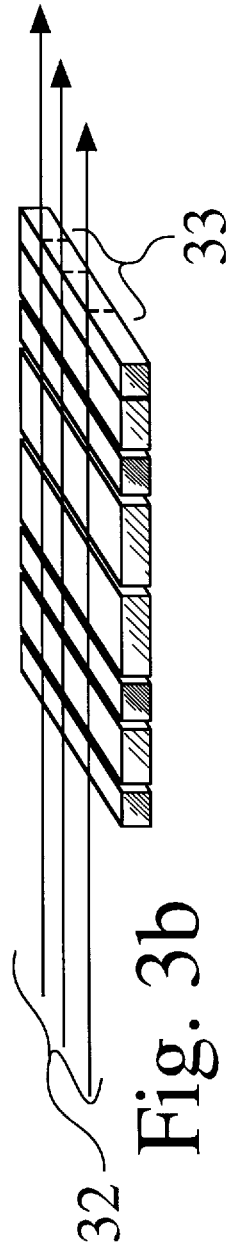
Figure 3C:
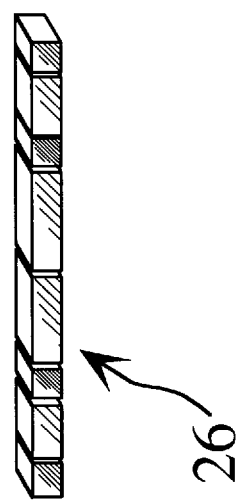

FIGS. 3a–3c show the dicing steps that are used to produce a polarization-independent optical isolator chip from a larger, optical isolator unit according to the invention. Each component of the optical isolator unit is AR-coated before the various components are aligned and glued together.

A layer of glass is provided at either end of the optical isolator unit on which the outer-facing side of the glass is AR-coated for air. To this end, the optical isolator unit may also include an AR-coated glass cover slide 37, 38 that has a refractive index that matches that of the optical-grade adhesive which is used to secure the various optical isolator unit components together.

Initially, the elements of the optical isolator unit 36, i.e., the AR-coated glass cover slides 37, 38, walkoff crystals 35a, 35b, 35c, 35d and Faraday rotator 39a, 39b, discussed above, are aligned and then glued together. The resulting optical isolator unit is typically 2 mm×2 mm×7.3 mm in size.

The invention applies a dicing method to dice the optical isolator unit 36 into smaller pieces that each ultimately comprise an individual optical isolator chip. During such dicing operation, the optical isolator unit is preferably mounted on any one of its sides in such a way that only a smallest possible cutting depth is required for dicing, i.e., it is mounted such that a thinnest possible dimension of the isolator is presented for cutting. This procedure reduces material loss due to cutting and prevents delamination of the isolator chips that are produced by such cutting.

A wafer saw is first used to cut the optical isolator unit 36 into four isolator pieces along the lines 31 in the direction shown by the lines 30 (FIG. 3a). Typically, the cutting depth during the first dicing operation is 2 mm, resulting in a cutting loss of about 150 µm of material. Thus, as a result of this operation shown in FIG. 3a, the isolator assembly is cut into four 2 mm×0.3875 mm ×7.3 mm isolator pieces.

The four isolator pieces formed by the first cutting operation are then each cut as shown by the lines 33 in the direction shown by the lines 32 (FIG. 3b). The cutting depth for this operation is 0.4 mm, producing a loss of material of 100 µm due to the cutting operation.

As a result of the two cutting operations, a total of 16 optical isolator chips 26 (FIG. 3c) are produced, where each optical isolator chip is 0.45 mm×0.3875 mm×7.3 mm. It will be appreciated by those skilled in the art that the dimensions described above relate only to the presently preferred embodiment of the invention, and that the invention is readily practiced to produce optical isolators having any desired dimension. The costs associated with producing such optical isolators provide a substantial economy that otherwise cannot be achieved, except by practicing the invention, because only one alignment and one assembly operation are required to produce several optical isolators. Additionally, very small optical isolators may be produced without the need for time consuming and therefore expensive micro-manufacturing and alignment operations. Such costs savings are relative to the particular optical isolator produced.

The optical isolator chips 26 are placed in an etched portion of a silicon bench 29 or micro-optical bench, as shown in FIG. 2. The silicon bench is also etched to provide a location for placing each of the AR-coated ball lenses 25 and 27, such that the isolator assembly 20 is readily formed with each component thereof in precise alignment, one component to the other. Additionally, the silicon bench is readily batch processed on a silicon wafer by etching appropriate patterns onto the wafer that predefine with precision the location of the lens and the location of the optical isolator chips.

It is significant to note that using a ball lens allows the fabrication of a smaller isolation assembly 20 because such lens is able to accommodate a smaller optical isolator. The ball lens is preferably made of glass or any other optical material having a high refractive index, e.g., ruby or sapphire.

Figure 4:
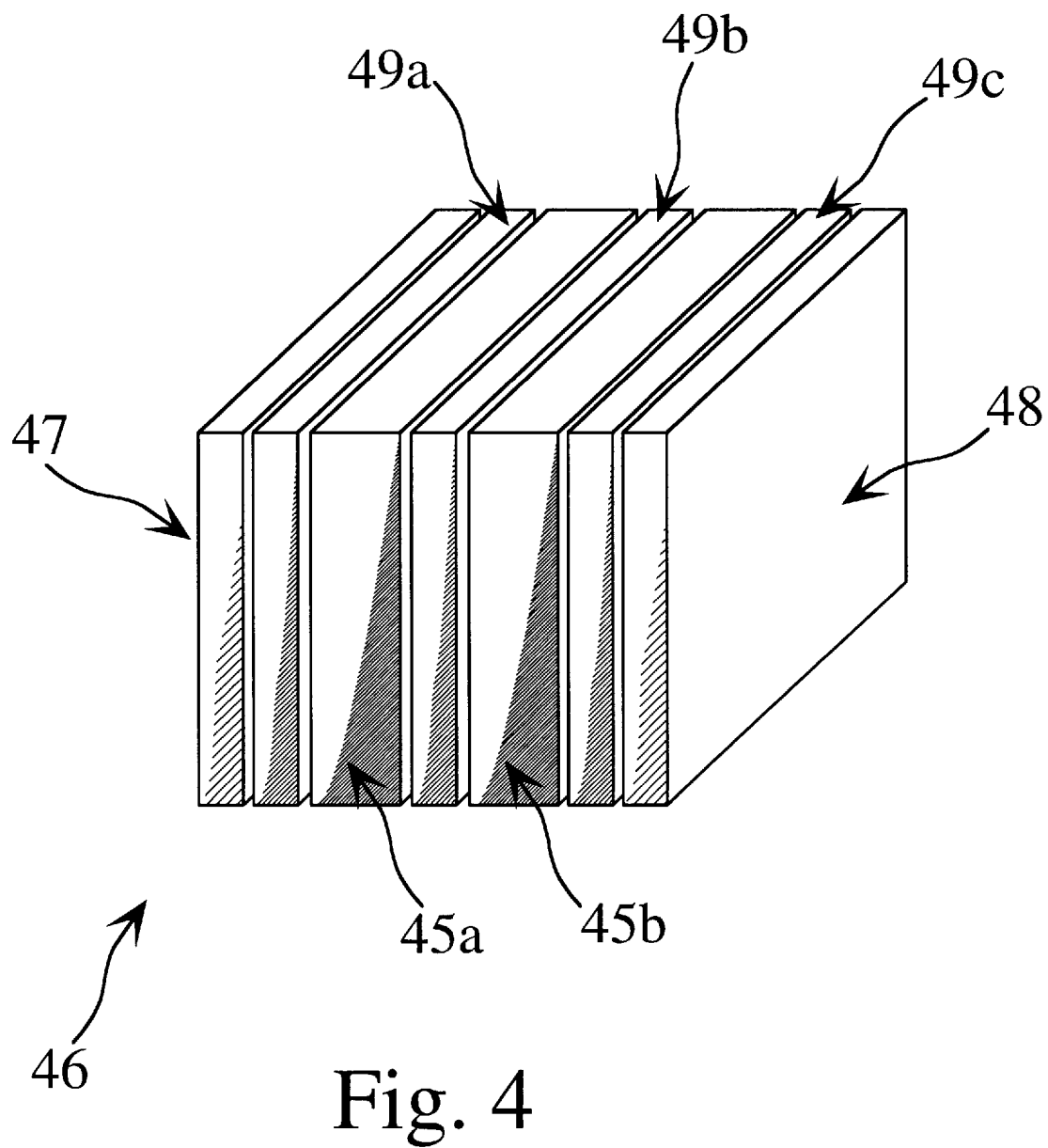
FIG. 4 is a block diagram of a polarization-dependent optical isolator according to the invention.

FIG. 4 is a block diagram of a polarization-dependent optical isolator unit from which isolator chips can be made according to the invention. Initially, the elements of an optical isolator unit 46, i.e., the AR-coated cover slides 47, 48, polarizers 49a, 49b, 49c, and Faraday rotator 45a, 45b are aligned and then glued together. The polarizers may be any appropriate polarizers, such as part no. is 1550-HC-0° manufactured by Corning, Inc., Advanced Product Department, Corning, N.Y. After assembly, the optical isolator unit is then processed as discussed above for the polarization-independent isolator of FIGS. 2 and 3a–3c.

Figure 5:
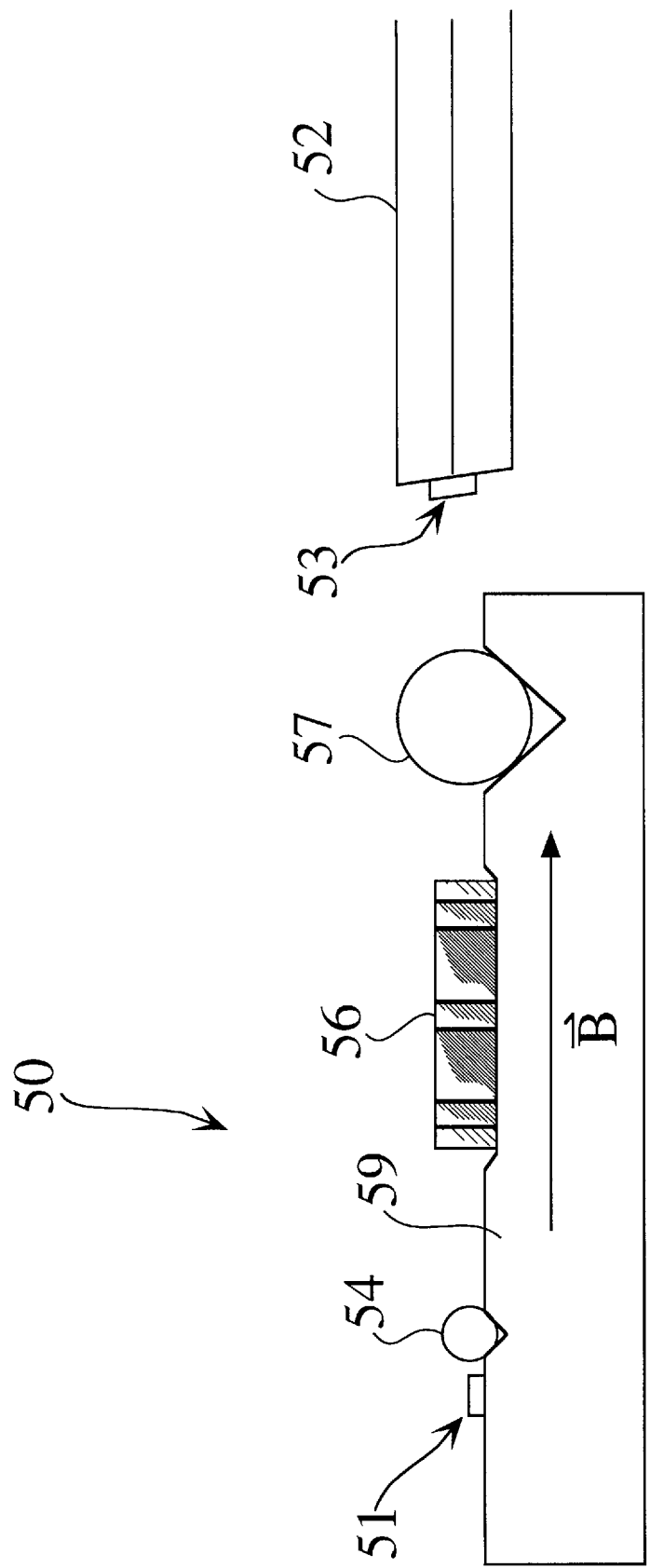
FIG. 5 is a block schematic diagram of an optical isolator according to a second, equally preferred embodiment of the invention.

FIG. 5 is a block schematic diagram of an optical isolator assembly 50 according to a second, equally preferred embodiment of the invention. This embodiment of the invention combines a laser source 51, such as a laser diode, and a ball lens 54, with a polarization-dependent optical isolator chip 56 of the type that is produced from the optical isolator unit 46, as discussed above in connection with FIG. 4. The laser source, ball lens, and optical isolator chip are mounted to a micro-optical bench 59 and coupled to a single-mode fiber 52 by a second ball lens 57. The system also includes an AR-coated glass cover slide 53 that is mounted directly to the single-mode fiber 52.

Figure 6:
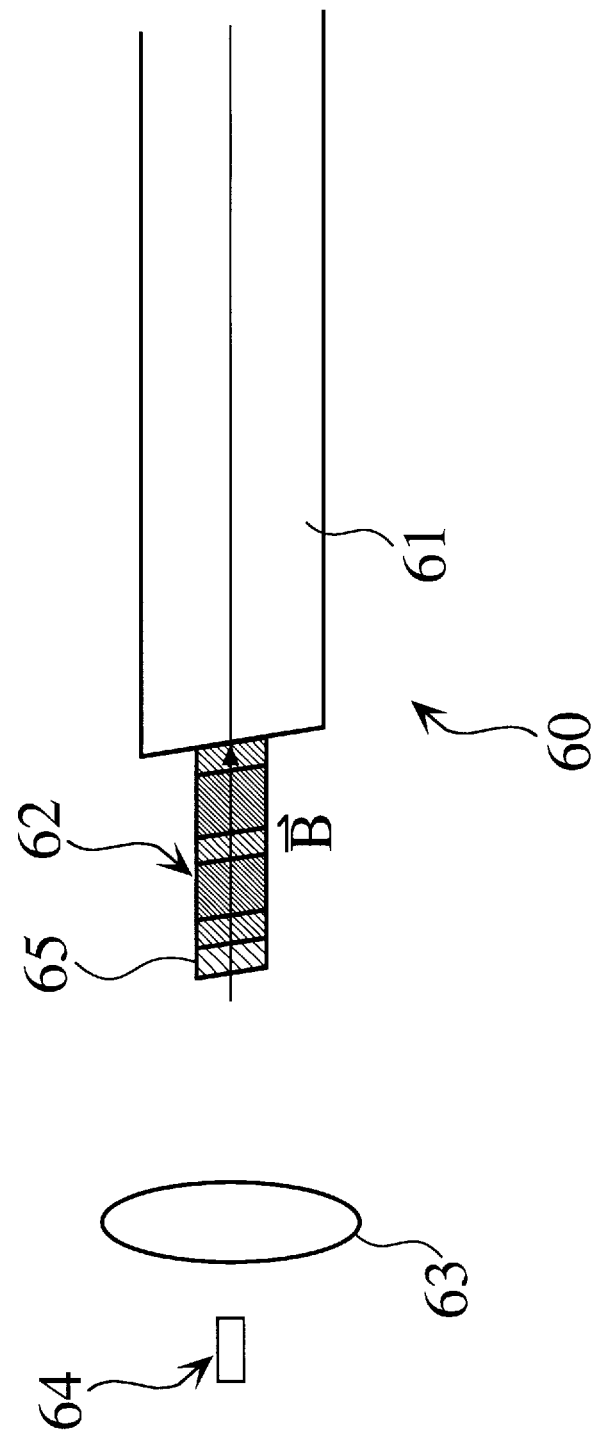
FIG. 6 is a block diagram of a single-mode fiber platform according to a third, equally preferred embodiment of the invention.

FIG. 6 is a block diagram of a single-mode fiber platform according to a third, equally preferred embodiment of the invention. In this embodiment of the invention, the optical isolator assembly 60 includes a single-mode fiber 61 to which an optical isolator chip 62 is glued. The optical isolator chip includes a single AR-coated glass cover slide 65. Light produced by a laser diode 64 is coupled through a lens 63 to the optical isolator chip 62.

Thus, the invention provides an optical isolator chip in which the material waste and cost is reduced. Because the optical isolator chips are very small, it is possible to place such optical isolators on a micro-optical bench, such as a silicon or ceramic bench, between a coupling AR-coated ball lens, which further reduces the size requirement of each optical isolator chip. The technique for fabricating the herein described optical isolator chips reduces the handling cost associated with the alignment and assembly of several small optical isolator components into a completed assembly by preassembling the optical isolator components in a large optical isolator unit, and by subsequently dicing the large optical isolator unit into several small optical isolator chips. Thus, the invention allows for a reduction of cost for fiber collimators, as well as providing improved, cost-reduced, polarization-dependent optical isolators for laser diode and semiconductor amplifiers.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. A method for fabricating an optical isolator, the method comprising the steps of:
   aligning a plurality of components that comprise said optical isolator;
   assembling said components as a laminate to from an optical isolator unit;
   subsequently dicing said optical isolator unit into optical isolator chips, wherein said dicing step further comprises the step of mounting said optical isolator unit on a side thereof in such a way that the least cutting depth is required, whereby said cutting proceeds simultaneously across each layer of said laminate; and
   placing an isolator chip in a micro-optical bench, along with an input fiber coupling ball lens and an output fiber coupling ball lens.

2. The method of claim 1, said assembling step further comprising the step of:
   gluing said components together with an optical-grade adhesive.

3. The method of claim 2, further comprising the step of:
   antireflection coating surfaces of said components to match a refractive index of said optical-grade adhesive.

4. The method of claim 1, wherein said optical isolator unit is diced into said optical isolator chips with a high-speed wafer saw.

5. The method of claim 4, wherein said dicing step includes the steps of:
   slicing said optical isolator unit in a first slicing operation to produce optical isolator pieces; and
   dicing each of said optical isolator pieces produced in said first slicing operation in a second, subsequent dicing operation.

6. The method of claim 1, wherein said assembling step further comprises the step of assembling together any of a polarizer, a birefringence walkoff crystal, and a Faraday rotator.

7. The method of claim 1, wherein said assembling step further comprises the step of assembling at least one glass plate into said optical isolator unit.

8. The method of claim 1, further comprising the step of:
   using said optical isolator chip in a fiber to fiber application.

9. The method of claim 1, further comprising the step of:
   using said optical isolator chip in a laser to fiber application.

* * * * *